United States Patent
Odell

(10) Patent No.: US 8,069,345 B2
(45) Date of Patent: Nov. 29, 2011

(54) METHODS AND SYSTEMS FOR RECOVERING A COMPUTER SYSTEM USING BOOT VOLUME DATA FROM A STORAGE AREA NETWORK

(75) Inventor: Jeffrey E. Odell, Irvine, CA (US)

(73) Assignee: Netapp, Inc., Sunnyvale, CA (US)

( * ) Notice: Subject to any disclaimer, the term of this patent is extended or adjusted under 35 U.S.C. 154(b) by 461 days.

(21) Appl. No.: 12/260,324

(22) Filed: Oct. 29, 2008

(65) Prior Publication Data

US 2010/0106955 A1    Apr. 29, 2010

(51) Int. Cl.
G06F 9/00       (2006.01)
G06F 15/177     (2006.01)

(52) U.S. Cl. .......................................... 713/2
(58) Field of Classification Search ................ 713/2, 1
See application file for complete search history.

(56) References Cited

U.S. PATENT DOCUMENTS

| | | | |
|---|---|---|---|
| 5,889,935 A | 3/1999 | Ofek et al. | |
| 6,052,797 A | 4/2000 | Ofek et al. | |
| 6,148,383 A | 11/2000 | Micka et al. | |
| 6,173,372 B1 | 1/2001 | Rhoades | |
| 6,697,960 B1 | 2/2004 | Clark et al. | |
| 7,149,916 B1 | 12/2006 | Marino | |
| 7,225,307 B2 | 5/2007 | Micka et al. | |
| 7,680,926 B2 * | 3/2010 | Tevis | 709/224 |
| 2004/0243796 A1 | 12/2004 | Keohane et al. | |
| 2007/0022184 A1 * | 1/2007 | Sharma et al. | 709/220 |
| 2007/0022281 A1 | 1/2007 | Haustein et al. | |
| 2007/0055853 A1 | 3/2007 | Hatasaki et al. | |
| 2007/0192466 A1 | 8/2007 | Nahum | |
| 2007/0208920 A1 * | 9/2007 | Tevis | 711/170 |
| 2008/0046548 A1 * | 2/2008 | Doran et al. | 709/222 |
| 2008/0250200 A1 * | 10/2008 | Jarvis et al. | 711/113 |
| 2009/0037723 A1 * | 2/2009 | Haustein et al. | 713/2 |
| 2009/0043976 A1 * | 2/2009 | Norberg et al. | 711/159 |

FOREIGN PATENT DOCUMENTS

JP    2006 172098 A  *  6/2006

OTHER PUBLICATIONS

"HP-UX System Administrator's Guide: Logical Volume Management," HP-UX 11i Version 3, Sep. 2008, 139 pages, Hewlett-Packard Development Company, L.P.

"Veritas™ Volume Replicator Option by Symantec," 5 pages, Symantec World Headquarters, Cupertino, California.

* cited by examiner

Primary Examiner — Mohammed Rehman
(74) Attorney, Agent, or Firm — Haynes and Boone, LLP

(57) ABSTRACT

Methods and systems for recovering and booting a computer system using a SAN. The computer system comprises a local storage device. A request for writing data to a boot volume on the local storage device is received. The data is written to the local storage device, as well as to the SAN at substantially the same time as receiving the request. The computer system can then be booted using the data written to the SAN.

17 Claims, 4 Drawing Sheets

METHODS AND SYSTEMS FOR RECOVERING A COMPUTER SYSTEM USING BOOT VOLUME DATA FROM A STORAGE AREA NETWORK

BACKGROUND

1. Field of the Invention

The invention relates generally to storage area network ("SAN") and more specifically relates to recovering and booting a computer system using a SAN.

2. Discussion of Related Art

To allow for recovery in the event of a disaster, many companies replicate data volumes of a computer server to a disaster recovery site that is remote from the computer server. While the data volumes comprise information for services provided by the computer server, the computer server also uses a boot volume that comprises operating system data and supporting files for booting and running the computer system. Accordingly, many companies also replicate or take a "snapshot" of the boot volume to allow the computer server (or its backup) to boot from a backup copy of the boot volume. However, keeping the snapshot of the boot volume up-to-date can be time consuming and error prone because the boot volume is being actively controlled by the operating system and is also being constantly updated by the administrator and various software.

One partial solution to this initial problem is known as Boot from SAN. Boot from SAN allows the computer server to directly use a logical unit of a SAN as the boot volume. Note that a "SAN" is used broadly and may actually refer to a volume, a logical unit, or a logical unit number of a storage area network. The SAN may be a local SAN, and logical units of the local SAN may then be replicated to a remote SAN at a disaster recovery site. Because the boot volume is actually a logical unit of the local SAN, it may be easier to keep a snapshot of the boot volume up-to-date on the remote SAN. For example, the local SAN rather than the computer server may be responsible to forward a write request to the remote SAN after the local SAN receives the write request from the computer system. However, there remains the problem of allowing the computer server to actually make use of the replicated boot volume on the remote SAN.

More specifically, a host bus adapter of the computer server would have already been configured to boot from the logical unit of the local SAN through a configured path. Meanwhile, multipathing technology is available to allow the computer server to access the logical unit through an alternate path similar to how TCP/IP reroutes network traffic. The multipathing technology is typically implemented in a multipath driver. Although the computer server would be able to access the logical unit whether through the configured path or the alternate path during normal operation with the use of the multipath driver, the multipath driver is not available during an initial boot process. Instead, the host bus adapter would only attempt to boot using the configured path rather than the alternative path during the initial boot process even if the configured path is broken. Additionally, although the multipath driver would also allow the computer server to access another logical unit (e.g., the replicated boot volume on the remote SAN) through another path, the multipath driver is likewise not available during the initial boot process.

Moreover, even if the host bus adapter incorporates certain multipathing capabilities, the host bus adapter is still unable to handle an event in which the host bus adapter is able to access a logical unit but is unable to actually boot from the logical unit. For example, one such event occurs when the configured path to the logical unit is not the currently "active" path in that the logical unit is being managed by a secondary controller.

Thus it is an ongoing challenge to recover and boot a computer server/system using a SAN.

SUMMARY

The present invention solves the above and other problems, thereby advancing the state of the useful arts, by providing methods and systems for recovering and booting a computer system using a SAN. The computer system comprises a local storage device. A request for writing data to a boot volume on the local storage device is received. The data is written to the local storage device, and to the SAN at substantially the same time as receiving the request. The computer system can then be booted using the data written to the SAN. Advantageously, by reworking the computer system to reincorporate the local storage device, the boot volume can be readily kept up-to-date between the local storage device and the SAN to allow the computer system to boot using the data from the SAN.

In one aspect hereof, a method is provided to use a storage area network ("SAN") for booting a computer system, wherein the computer system comprises a local storage device. The method comprises receiving a request for writing data of a boot volume to the local storage device. The boot volume comprises operating system data and supporting files for booting the computer system. The method also comprises writing the data to the local storage device, and writing the data to the SAN at substantially the same time as receiving the request. The method further comprises booting the computer system using the data written to the SAN.

In another aspect hereof, a computer readable medium having instructions is provided for performing a method to use a storage area network ("SAN") for booting a computer system in accordance with the method described above.

Yet another aspect hereof provides a computer system using a storage area network ("SAN") for booting the computer system. The computer system comprises a local storage device, a storage controller for communication with the local storage device, and a network adapter for communication with the SAN. The storage controller is directly coupled with the local storage device without an intervening network. The computer system also comprises a receiving element for receiving a request for writing data of a boot volume to the local storage device. The boot volume comprises operating system data and supporting files for booting the computer system. Additionally, the computer system comprises a first writing element for writing the data to the local storage device and a second writing element for writing the data to the SAN at substantially the same time as receiving the request. The computer system also comprises a booting element for booting the computer system using the data written to the SAN.

DETAILED DESCRIPTION OF THE DRAWINGS

Figure 1:
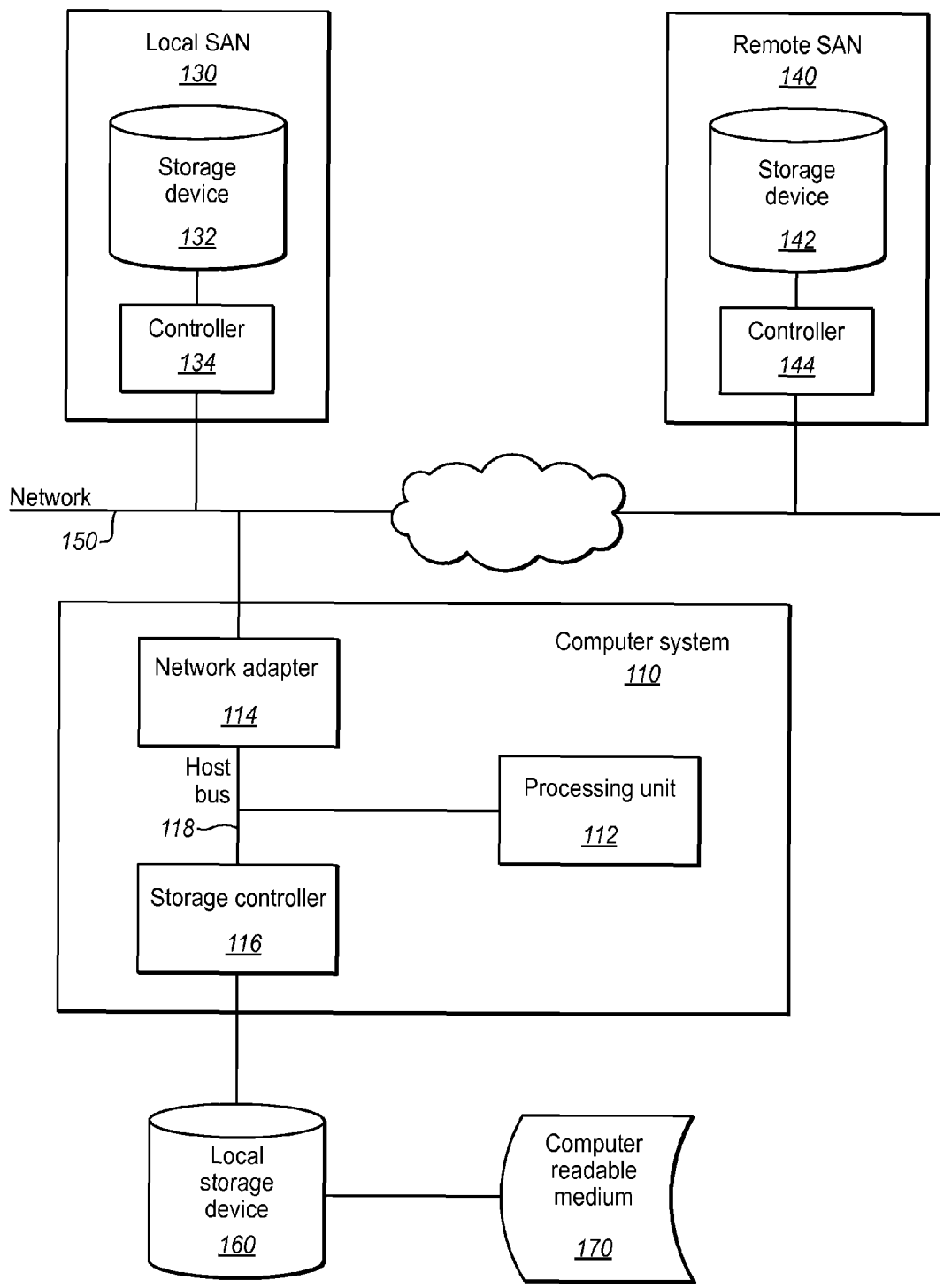
FIG. 1 is a block diagram of an exemplary computer system in accordance with features and aspects hereof.

FIG. 1 is a block diagram of an exemplary computer system 110 in accordance with features and aspects hereof. The computer system 110 is in communication with a local SAN 130 through a network 150. Both the computer system 110 and the local SAN 130 are also in communication with the remote SAN 140 through the network 150. Additionally, the computer system 110 is in communication with a storage device 160. For example, the storage device 160 may be a rotational disk drive or a flash-based drive. A computer readable medium 170 is used to supply instructions including driver software to the storage device 160 and/or the computer system 110. The computer readable medium 170 can comprise any apparatus that can contain, store, communicate, propagate, or transport the instructions. Examples include a semiconductor or solid state memory, magnetic tape, a removable computer diskette, a random access memory ("RAM"), a read-only memory ("ROM"), a rigid magnetic disk, and an optical disk (e.g., CD-ROM, CD-R/W, DVD-ROM, and DVD+/−R/W).

The computer system 110 comprises a processing unit 112, a network adapter 114, and a storage controller 116. The computer system 110 is in communication with the storage device 160 through the storage controller 116. For example, the storage controller 116 may be a Redundant Array of Independent Disks ("RAID") controller. The storage controller 116 is directly coupled with the local storage device 160 without an intervening network. The communication with the local storage device 160 may be through any of a number of local storage attachment technologies. For example, the communication protocol may be selected from Serial Advanced Technology Attachment ("SATA"), Small Computer System Interface ("SCSI"), Serial Attached SCSI ("SAS"), Parallel AT Attachment ("PATA") including Integrated Drive Electronics ("IDE") and Enhanced IDE ("EIDE"), IEEE 1394 (e.g., FireWire), and Universal Serial Bus ("USB"). It will be understood that to be directly coupled using the SAS protocol, a SAS cable may be used without a SAS expander and/or switch.

The computer system 110 can communicate through the network 150 by using the network adapter 114. For example, the network adapter 114 may be an Ethernet adapter or a SAS host bus adapter. The network may be based on one of Ethernet, Fibre Channel, Internet SCSI ("iSCSI"), SAS, and TCP/IP. Additionally, the processing unit 112 may be in communication with the storage controller 116 and the network adapter 114 through a host bus 118 selected from one of Peripheral Component Interconnect ("PCI"), Peripheral Component Interconnect Extended ("PCI-X"), and PCI Express.

The processing unit 112 may comprise circuitry, memory, processor, and/or instructions to handle processing needs of the computer system 110. For example, the processing unit 112 may execute a basic input output system ("BIOS") of the computer system 110 comprising one (e.g., sometimes called an option ROM) that is supplied by the storage controller 116 and/or the network adapter 114 during the boot process. During normal operation, the processing unit 112 may execute drivers for the storage controller 116 and the network adapter 114 under the control of an operating system. It will be understood that features and aspects hereof may be implemented in one or more of these components of the computer system.

The local SAN 130 comprises a controller 134 and a storage device 132. The storage device 132 is coupled with the network 150 through the controller 134 to allow the computer system 110 to use the storage device 132. For example, the storage device 132 may be made available as various logical units of the local SAN 130. Similarly, the remote SAN 140 comprises a controller 142 and a storage device 144. The local SAN 130 would typically be co-located with the computer system 110, while the remote SAN 140 would typically be located at a disaster recovery center. The disaster recovery center is typically a facility remote from the computer system 110. One or more networks may separate the remote SAN 140 from the computer system 110 and the local SAN 130 as designated by a network cloud.

In a Boot from SAN application, the network adapter 114 may have been configured to communicate with the controller 134 of the local SAN 130 in order for the computer system 110 to boot from the local SAN 130. A multipath driver running at the computer system 110 would allow the network adapter 114 to communicate with the controller 144 of the remote 140. However, the multipath driver is not available during an initial boot process as noted above.

Those of ordinary skill in the art will readily recognize numerous additional and equivalent components and modules within a fully functional apparatus. Such additional and equivalent components are omitted herein for simplicity and brevity of this discussion. Thus, the structures of FIG. 1 are intended merely as representatives of exemplary embodiments of features and aspects hereof.

As will be explained in greater detail, features and aspects hereof advantageously allow boot volumes to reside on the local storage device 160, the local SAN 130, and the remote SAN 140. It will be appreciated by those skilled in the art that the boot volumes on both the local storage device 160 and the local SAN 130 are typically synchronized continuously at the occurrence of each write request in accordance with features and aspects hereof. The boot volumes on both the local SAN 130 and the remote SAN 140 may also be synchronized by replicating/mirroring the boot volume from the local SAN 130 to the remote SAN 140. In a recovery operation, the boot volume from the remote SAN 140 may then be replicated/mirrored back to the local SAN 130. Alternatively or in addition, the boot volume can also be replicated/mirrored back to the local storage device 160 (which may be a replacement storage device of the original) of the computer system 110 (which may also be a replacement/backup computer system of the original).

Figure 2:
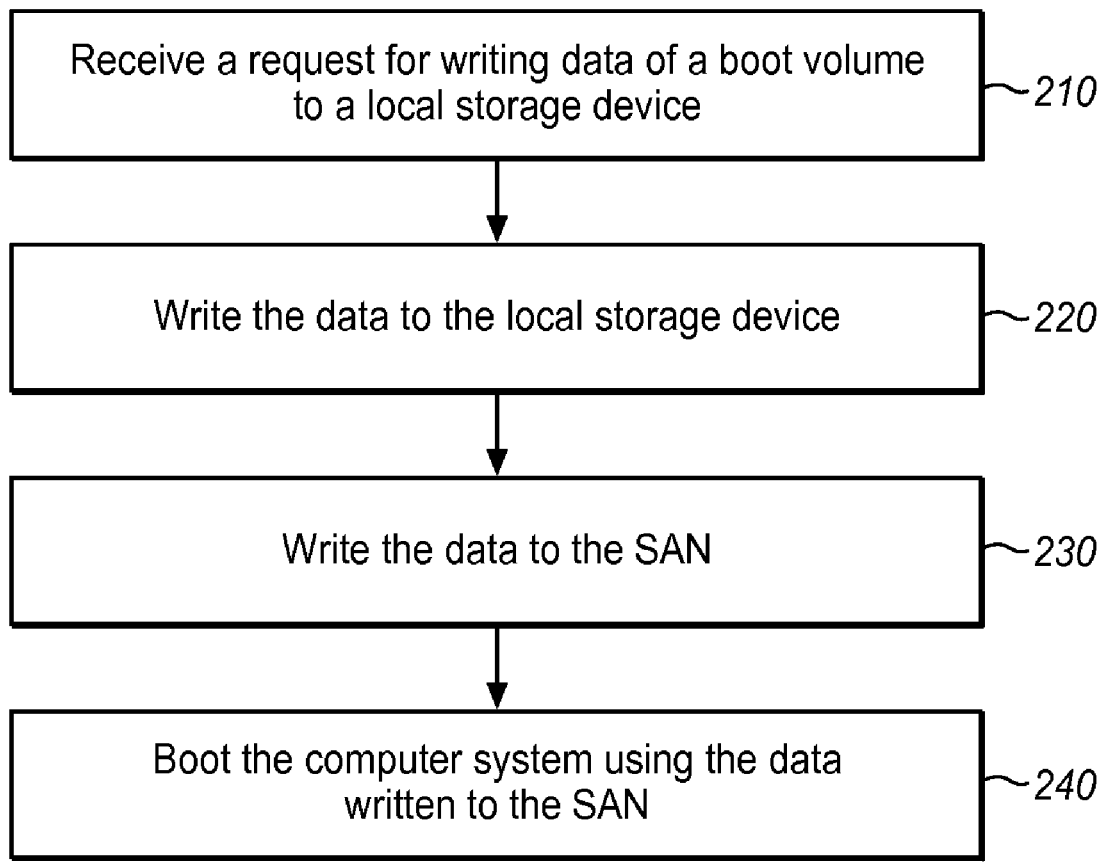
FIG. 2 is a flowchart describing an exemplary method in accordance with features and aspects hereof for booting a computer system using a SAN.

FIG. 2 is a flowchart describing an exemplary method in accordance with features and aspects hereof for booting a computer system using a SAN. At step 210, a driver for a storage controller receives a request for writing data of a boot volume to a local storage device. The boot volume comprises operating system data and supporting files for booting the computer system. At step 220, the driver writes the data to the local storage device. At substantially the same time as receiving the request, the driver also writes the data to the SAN at step 230. As part of a recovery process, the computer system executes at step 240 a BIOS that allows the computer system to boot using the data that has been written to the SAN.

Figure 3:
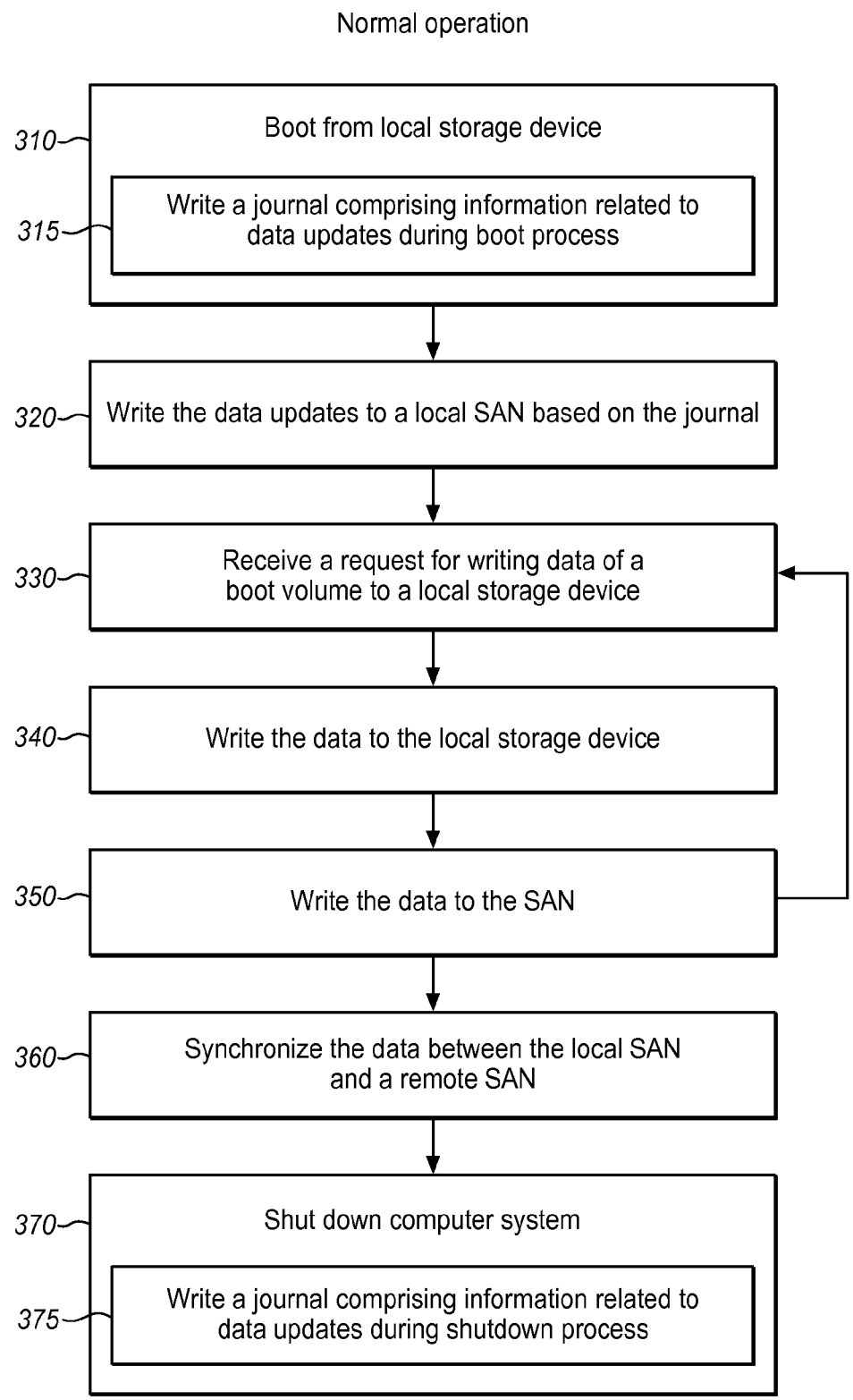
FIG. 3 is a flowchart describing an exemplary method in accordance with features and aspects hereof during normal operation to allow a computer system to boot using a SAN.

FIG. 3 is a flowchart describing an exemplary method in accordance with features and aspects hereof during normal operation to allow a computer system to boot using a SAN. At step 310, the computer system executes a BIOS that allows the computer system to boot from a boot volume of a local storage device. The boot volume comprises operating system data and supporting files for booting the computer system. During the boot process, the computer writes a journal to the local storage device at step 315 such that the journal comprises information related to data updates during the boot process. Following the boot process, the computer system processes at step 320 the journal and initiates write requests to write the data updates to the SAN based on the journal.

For example, a journal entry may comprise information related to an update not yet written to the SAN. During normal operation following the boot process, the computer system then initiates a write request to the SAN for each journal entry, and then delete each journal entry after the update has been written to the SAN. Entries of the journal may be continuously added and deleted in a first-in-first-out fashion even during normal operation to maintain ordering of data writes and to handle interruptions in accessing the SAN. Additionally, there may not already be a boot image on the SAN. If so, the boot volume may be replicated from the local storage device to the SAN in an initialization operation. For example, using administrative tools of the computer system and/or the SAN, data from the local storage device is read, and the read data is written to the SAN. Journal entries would be managed accordingly to ensure that the local storage device is synchronized with the SAN.

At step 330, a driver for a storage controller of the computer system receives a request for writing data of the boot volume to the local storage device (or another local storage device). At step 340, the driver writes the data to the local storage device. At substantially the same time as receiving the request, the driver running at the computer system also writes the data to the SAN at step 350. The data would typically not be written by the local storage device to the SAN, but is written by the computer system itself to the SAN. As noted above, a journal may be used to handle interruptions in accessing the SAN. Accordingly, it will be understood that in some instances, there may be a delay between steps 340 and 350. However, the boot volume on the local storage device and the SAN would typically be synchronized continuously rather than at fixed intervals and/or upon a request by an administrator.

During normal operation, steps from 330 are repeated as the driver receives each request for writing data. Within the computer system, the driver may write to the SAN by issuing a request to a driver for a network adapter through which the computer system communicates with the SAN. As a design choice, the driver may combine several write requests into one write request to the SAN. Alternatively, the driver may also separate one write request into several write requests to the SAN.

It is noted that the SAN may be a local SAN co-located with the computer system. At step 360, the data between the local SAN and a remote SAN may be synchronized. The remote SAN may be located at a disaster recovery center, and the disaster recovery center may be a facility remote from the computer system. The step of synchronization may be performed through a SAN administrator tool available through the local (and/or the remote) SAN. The synchronization may be performed at fixed intervals and/or requested by an administrator. Alternatively or in addition, the step of synchronization may be performed by the local SAN that in turn forwards each write request to the remote SAN.

At step 370, the computer system enters a shut down process to shut down the computer system in an orderly fashion. Typically, network connections would be closed even though the computer system still has data in memory that the computer system needs to flush and write to the local storage device. Accordingly, the computer system would write a journal to the local storage device at step 375 similar to step 315 such that the journal comprises information related to data updates during the shutdown process. The journal may be a different journal or the same journal as the journal mentioned above with regard to step 315. After the computer system boots at step 310 mentioned above, the computer would write the data updates during the shutdown process to the SAN based on the journal similar to that described above with regard to step 320.

Figure 4:
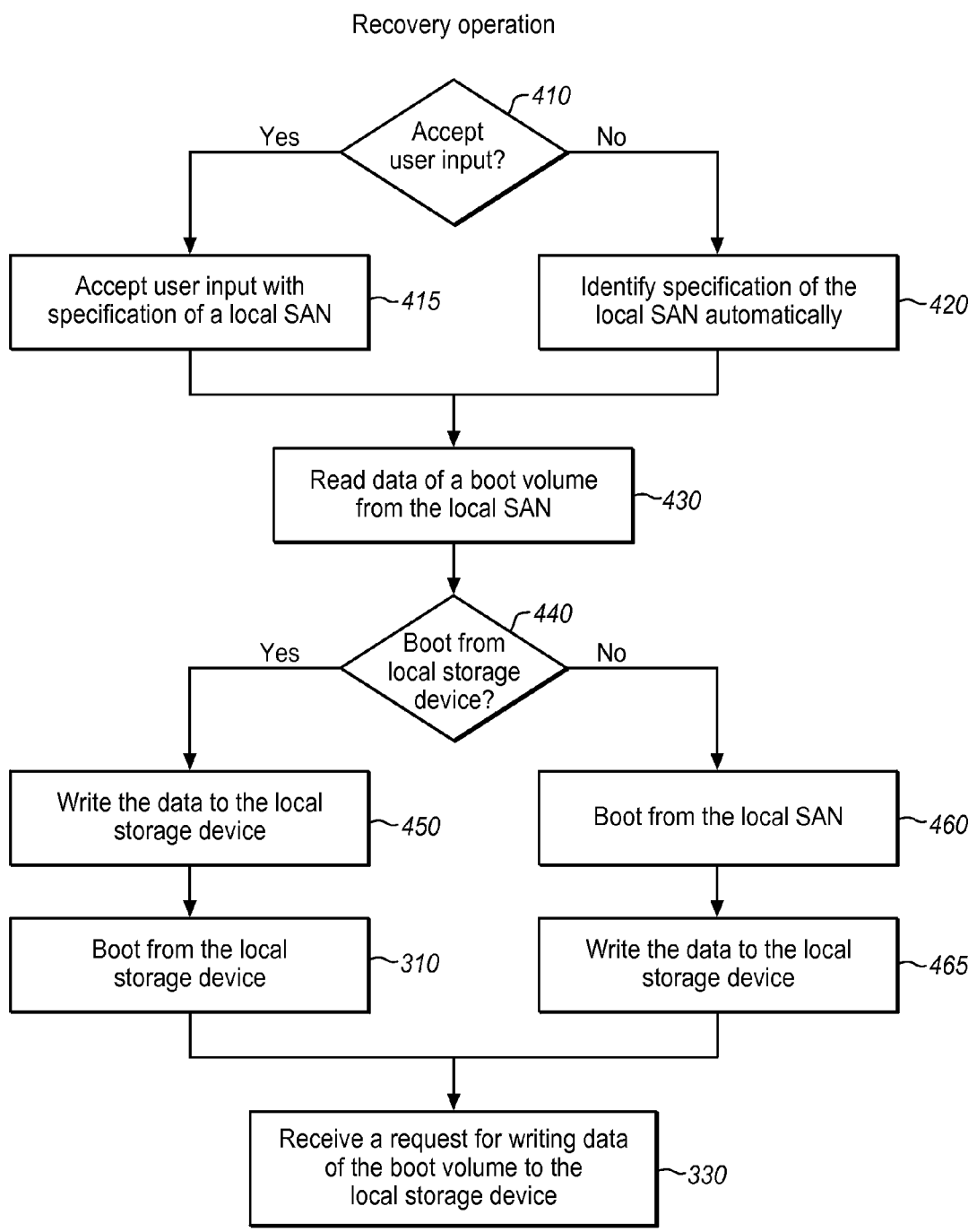
FIG. 4 is a flowchart describing an exemplary method in accordance with features and aspects hereof for booting a computer system using a SAN in a recovery operation.

FIG. 4 is a flowchart describing an exemplary method in accordance with features and aspects hereof for booting a computer system using a SAN in a recovery operation in which the local storage device needs to be recovered. At step 410, the computer system determines during a boot process whether to accept user input to specify a source of data to be used for booting. For example, the computer system may accept a user input if the user/administrator press one or more hot-keys. If the hot-key(s) is pressed, the computer system accepts at step 415 the user input with specification of a local SAN. For example, the user may be provided a command line interface and/or graphical interface to specify the local SAN, which may further comprise a specification of a logical unit of the local SAN. Alternatively, the user may be allowed to specify a remote SAN.

As alluded to above, a multipath driver is not available during an initial boot process to allow the computer to access another logical unit (e.g., on the remote SAN). Additionally, even if certain multipathing capabilities can be made available during the initial boot process, the computer system is still unable to handle an event in which the computer system can access a boot volume, but is not actually able to boot from the boot volume due to damages to the boot volume. It will be appreciated by those skilled in the art that the manual intervention advantageously allows a user/administrator to specify whether the computer system should boot from the local storage device, the local SAN, the remote SAN, or even another device.

If no user input needs to be accepted, the computer system may identify a specification of the local SAN automatically at step 420. A boot sequence may have already been configured into the computer system. For example, a user/administrator may have already specified that the computer system should attempt to boot from a local storage device first, and if unsuccessful, the computer system should attempt to boot from the local SAN next. Alternatively, the user may have also specified that the computer system should attempt to boot through a network adapter next. The network adapter and/or the BIOS of the computer system may have also been configured to attempt to boot from the local SAN, and if unsuccessful, attempt to then boot from a remote SAN.

In this exemplary method, the computer system is to use the data from the local SAN to boot the computer system. It is noted that the local SAN may have already been recovered by synchronizing/replicating data from a remote SAN to the local SAN as alluded to earlier. At step 430, the computer system reads data of a boot volume from the local SAN through the network adapter. At step 440, the computer system determines whether to actually boot from the local storage device or to boot using the data read from the local SAN directly. This choice may have already been configured into the computer system. Alternatively or in addition, a user/administrator may be allowed to specify this choice during the boot process, for example, as part of the step 415 mentioned above. If the computer system is to boot from the local storage device, the computer system first writes the read data to the local storage device at step 450 to recover the local storage device, and then boots from the local storage device similar to that described with regard to step 310.

If the computer is to boot from the local SAN directly, the computer system does so at step 460 similar to a Boot from SAN application. Subsequently, the computer system writes the data read from the SAN to the local storage device at step 465, thus also recovering the local storage device. It will be understood that to maintain synchronization between the local SAN and the local storage device, a journal similar to one described at step 315 may be written to the local SAN so that data updates may be written to the local storage device (after recovering the local storage device with data from the local SAN at step 465). The computer system may be configured at a later time to boot from the local storage device.

Subsequently, the computer system enters normal operation, and repeats those steps starting at step 330 described above. Those of ordinary skill in the art will readily recognize numerous additional and equivalent steps that may be performed and/or omitted in the methods of FIGS. 2 through 4. Such additional and equivalent steps are omitted herein merely for brevity and simplicity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method to use a storage area network ("SAN") for booting a computer system, wherein the computer system comprises a local storage device, the method comprising:
   receiving a request for writing data of a boot volume to the local storage device, wherein the boot volume comprises operating system data and supporting files for booting the computer system;
   writing the data to the local storage device;
   writing the data to the SAN contemporaneously with receiving the request;
   booting the computer system using the data written to the SAN;
   writing a journal to the local storage device, wherein the journal comprises information related to data updates during a shutdown process; and
   writing, following the step of booting, the data updates to the SAN based on the journal.

2. The method of claim 1, wherein:
   the computer system is in communication with the local storage device through a storage controller directly coupled with the local storage device without an intervening network;
   the computer system is in communication with the local storage device through a protocol selected from Serial Advanced Technology Attachment ("SATA"), Small Computer System Interface ("SCSI"), Serial Attached SCSI ("SAS"), Parallel AT Attachment ("PATA") including Integrated Drive Electronics ("IDE") and Enhanced IDE ("EIDE"), IEEE 1394, and Universal Serial Bus ("USB");
   the computer system is in communication with the SAN through a network adapter;
   the computer system is in communication with the SAN through a network based on one of Ethernet, Fibre Channel, Internet SCSI ("iSCSI"), SAS, and TCP/IP; and
   the computer system is in communication with the storage controller and the network adapter through a host bus selected from one of Peripheral Component Interconnect ("PCI"), Peripheral Component Interconnect Extended ("PCI-X"), and PCI Express.

3. The method of claim 1, further comprising:
   replicating the boot volume from the local storage device to the SAN, comprising:
   reading the data from the local storage device; and
   writing the read data to the SAN.

4. The method of claim 1, wherein the SAN is a local SAN co-located with the computer system, the method further comprising:
   synchronizing the data between the local SAN and a remote SAN, wherein the remote SAN is located at a disaster recovery center, the disaster recovery center being a facility remote from the computer system.

5. The method of claim 1, further comprising:
   accepting a user input with a specification of the SAN;
   reading the data from the SAN; and
   writing the read data to the local storage device;
   wherein the step of booting comprises booting the computer system using the data written to the local storage device.

6. The method of claim 1, further comprising:
   identifying a specification of the SAN automatically.

7. The method of claim 1, further comprising reading the data from the SAN, wherein the step of booting comprises booting the computer system directly using the data read from the SAN, the method further comprising:
   writing the read data to the local storage device after using the read data for booting the computer system.

8. The method of claim 1, wherein the journal comprises information related to data updates during the booting step.

9. The method of claim 1, further comprising:
   writing a journal entry to the local storage device, wherein the journal entry comprises information related to a data update not yet written to the SAN; and
   deleting the journal entry after the data update has been written to the SAN.

10. A non-transitory computer readable medium having instructions for performing a method to use a storage area network ("SAN") for booting a computer system, wherein the computer system comprises a local storage device, the method comprising:
    receiving a request for writing data of a boot volume to the local storage device, wherein the boot volume comprises operating system data and supporting files for booting the computer system;
    writing the data to the local storage device;
    writing the data to the SAN contemporaneously with receiving the request; and
    booting the computer system using the data written to the SAN;
    wherein the step of booting comprises writing a journal to the local storage device, wherein the journal comprises information related to data updates during the booting step, and wherein the method further comprises:
    writing, following the step of booting, the data updates to the SAN based on the journal.

11. The computer readable medium of claim 10, wherein:
    the computer system is in communication with the local storage device through a storage controller directly coupled with the local storage device without an intervening network;
    the computer system is in communication with the local storage device through a protocol selected from Serial Advanced Technology Attachment ("SATA"), Small Computer System Interface ("SCSI"), Serial Attached SCSI ("SAS"), Parallel AT Attachment ("PATA") including Integrated Drive Electronics ("IDE") and Enhanced IDE ("EIDE"), IEEE 1394, and Universal Serial Bus ("USB");

the computer system is in communication with the SAN through a network adapter;

the computer system is in communication with the SAN through a network based on one of Ethernet, Fibre Channel, Internet SCSI ("iSCSI"), SAS, and TCP/IP; and the computer system is in communication with the storage controller and the network adapter through a host bus selected from one of Peripheral Component Interconnect ("PCI"), Peripheral Component Interconnect Extended ("PCI-X"), and PCI Express.

12. The computer readable medium of claim 10, wherein the method further comprises:
   replicating the boot volume from the local storage device to the SAN, comprising:
      reading the data from the SAN; and
      writing the read data to the local storage device.

13. The computer readable medium of claim 10, wherein the SAN is a local SAN co-located with the computer system, and wherein the method further comprises:
   synchronizing the data between the local SAN and a remote SAN, wherein the remote SAN is located at a disaster recovery center, the disaster recovery center being a facility remote from the computer system.

14. The computer readable medium of claim 10, wherein the method further comprises:
   accepting a user input with a specification of the SAN;
   reading the data from the SAN; and
   writing the read data to the local storage device;
   wherein the step of booting comprises booting the computer system using the data written to the local storage device.

15. A computer system using a storage area network ("SAN") for booting the computer system, the computer system comprising:
   a local storage device;
   a storage controller for communication with the local storage device, wherein the storage controller is directly coupled with the local storage device without an intervening network;
   a network adapter for communication with the SAN;
   a receiving element for receiving a request for writing data of a boot volume to the local storage device, wherein the boot volume comprises operating system data and supporting files for booting the computer system;
   a first writing element for writing the data to the local storage device;
   a second writing element for writing the data to the SAN contemporaneously with receiving the request;
   a booting element for booting the computer system using the data written to the SAN;
   a journaling element for writing a journal to the local storage device, wherein the journal comprises information related to data updates during a shutdown process; and
   a third writing element for writing, following the step of booting, the data updates to the SAN based on the journal.

16. The computer system of claim 15, further comprising:
   an identifying element for identifying a specification of the SAN automatically.

17. The computer system of claim 15, further comprising a reading element for reading the data from the SAN, wherein:
   the booting element is further adapted for booting the computer system directly using the data read from the SAN; and
   the first writing element is further adapted for writing the read data to the local storage device after the data has been used for booting the computer system.

* * * * *